United States Patent [19]

Nonoue et al.

[11] Patent Number: 4,564,288
[45] Date of Patent: Jan. 14, 1986

[54] ELECTROSTATIC RECORDING APPARATUS

[75] Inventors: Torahiko Nonoue; Etsuzo Moriki; Yoshifumi Miyazaki; Takahal Izawa; Shinichi Kikkawa; Kenhachi Shiraki, all of Hyogo, Japan

[73] Assignee: Sanyo Electric Co., Ltd., Japan

[21] Appl. No.: 691,277

[22] Filed: Jan. 14, 1985

[30] Foreign Application Priority Data

Jul. 2, 1984 [JP] Japan ................................ 59-136951

[51] Int. Cl.[4] ...................... G03B 27/34; G03B 27/40; G03B 27/70
[52] U.S. Cl. ........................................ 355/57; 355/8
[58] Field of Search .......................... 355/55, 57, 8, 11

[56] References Cited

U.S. PATENT DOCUMENTS

| | | | |
|---|---|---|---|
| 4,336,995 | 6/1982 | Durbin et al. | 355/57 X |
| 4,362,382 | 12/1982 | Simpson | 355/8 X |
| 4,377,337 | 3/1983 | Beck | 355/8 |
| 4,436,416 | 3/1984 | Negoro et al. | 355/57 |

Primary Examiner—Richard A. Wintercorn
Attorney, Agent, or Firm—Darby & Darby

[57] ABSTRACT

An electrostatic recording apparatus such as an electrophotographic copying machine includes a mobile light source being able to move reciprocatively and exposing an original copy at its forward going motion. Reflected light from the original copy exposed by the light source produces an image on a photosensitive drum through an image-forming lens, and an electrostatic latent image is formed on the photosensitive drum. This electrostatic latent image is developed with a toner to form a visible image, and the toner image is transferred onto a paper fed from a paper feeding part. Papers of different sizes can be fed from the paper feeding part, and in response to this paper size, data such as moving speed and moving distance of the light source are read from the ROM, being given to a motor controller. As a function of the paper size, different returning speed data are set in advance, and accordingly, the light source can return at a speed responding to the paper size. Furthermore, since the light source forms an image of different magnification from that of the original copy, it is moved at a different speed. When a different magnification is set, a moving speed data of the light source responding to its magnification is read from the ROM. Accordingly, the moving speed of the light source can be varied also in response to the magnification.

8 Claims, 13 Drawing Figures

ELECTROSTATIC RECORDING APPARATUS

BACKGROUND OF THE INVENTION

1. Field of Invention

The present invention relates to an electrostatic recording apparatus. More specifically, the present invention relates to an electrostatic recording apparatus, for example, such as an electrographic copying machine, which exposes an original copy by means of a mobile light source (scanning means), forming an image by means of this exposure on a paper.

2. Description of the Prior Art

One example of the electrographic copying machine being the background of the present invention is disclosed, for example, in the Japanese Patent Application Laid-Open No. 12944/1983 laid open on Aug. 2, 1983 and so on. In the conventional electrographic copying machine of this kind, the moving speed at returning motion of the mobile light source (hereinafter referred to as returning speed) is always constant. For this reason, so far a problem as described below has been present.

FIG. 1 and FIG. 2 are graphs showing one conventional example of the relationship between the moving speed and time. FIG. 1 shows a case where a paper of A4 size is used, and FIG. 2 shows a case where a paper of A3 size is used. Both FIG. 1(A) and FIG. 2(A) show the movement of the light source. Both FIG. 1(B) and FIG. 2(B) show the operation of a paper feeding part, and "Tp" represent the operating time, more specifically, the rotating time of a paper feeding roller (not illustrated), that is, the time during which the tip of the fed paper is in contact with the register roller as described later. In FIG. 1 and FIG. 2, "Vf1" and "Vf2" show the speed at forward going motion (hereinafter referred to as forward going speed) of a scanning means, that is, the mobile light source (not illustrated), and "Tf1" and "Tf2" show the forward going time of the light source responding to the paper size, respectively. Accordingly, when a paper of A4 size is used, the light source goes a distance equivalent to an area F1 expressed by "Vf1×Tf1". Similarly, when a paper of A3 size is used, the light source goes a distance represented by an area F2. Furthermore, "Vr1" and "Vr2" are the returning speeds of the mobile light source (not illustrated), respectively, and "Tr1" and "Tr2" are the returning times of the light source in respective cases. Accordingly, the light source returns a distance equivalent to an area R1 expressed by "Vr1×Tr1" in the case of A4 size, and returns a distance equivalent to an area R2 in the case of A3 size.

Since the foward going distance and the returning distance are equal, a relation to F1 (F2)=R1 (R2) holds. On the other hand, since the returning speeds Vr1 and Vr2 are constant, a relation of Vr1=Vr2 also holds.

As is apparent from these FIG. 1 and FIG. 2, when the paper of A4 size is used, a time of "Tf1+Tr1" is required for a sheet of paper, while when the paper of A3 size is used, a time of "Tf2+Tr2" is required for a sheet of paper. That is, in the above-mentioned example, when the forward going distance is long, a long returning time is required, and in reverse, when the forward going distance is short, the returning time becomes short, and therefore on the case where the paper of A3 size is used, a longer time is required in comparison with the case where the paper of A4 size is used.

FIG. 3 and FIG. 4 are graphs showing other conventional examples of relationship between the moving speed and time of the light source. FIG. 3 shows a case where the paper of A3 size is used, and FIG. 4 shows a case where the paper of A4 size is used. In these examples as shown in FIG. 3 and FIG. 4, the returning speeds Vr3 and Vr4 of the light source are made higher respectively in comparison with the returning speeds Vr1 and Vr1 as shown in FIG. 1, and a relation of Vr3=Vr4>Vr1=Vr2 holds. As is shown in FIG. 3, in this conventional example, the returning speed of the light source is set so that the returning time of the light source Tr3 agrees nearly with the paper feeding time Tp when the paper of A3 size is used. On the other hand, since Vr3=Vr4, when the paper of A4 size is used, as shown in FIG. 4, a waiting time Ts expressed by "Tp−Tr4" is produced. This is because, in the case of the A4 size, the paper feeding operation is not completed yet at the time when returning motion of the light source has been completed.

Thus, in the examples as shown in FIG. 1 and FIG. 2, a longer time is required, thereby the efficiency being worse in the case where a large-sized paper is used.

Furthermore, in the examples as shown in FIG. 3 and FIG. 4, the waiting time Ts is produced and the efficiency is not good in the case where a small-sized paper is used. On the other hand, in order to elongate the life of the machine by reducing the vibration thereof, it is desirable that the moving speed of the scanning means, that is, the light source is as low as possible. In this case, however, as shown in FIG. 1 and FIG. 2, too much time is required, and accordingly, as shown in FIG. 3 and FIG. 4, the returning speed is made higher. However, if the waiting time Ts is produced by increasing the returning speed, the mechanical shock should be rather minimized by suppressing the returning speed by the amount equivalent to this waiting time.

Thus, the conventional electrostatic recording apparatuses for example, the electrographic copying machine has not been able to cope with the above-mentioned deficiency because the returning speed is always constant.

SUMMARY OF THE INVENTION

Therefore, the principal object of the present invention is to provide a novel electrostatic recording apparatus wherein the returning speed of the scanning means can be changed.

Another object of the present invention is to provide an electrostatic recording apparatus which can form an image as fast as possible and also can minimize the mechanical shock.

In accordance with the present invention, the recording time can be shortened even in the case where a large-sized paper is used, while the mechanical shock can be reduced by more lowering the moving speed of the scanning means and thereby the life of the machine can be elongated in the case where a small-sized paper is used.

In a preferable embodiment in accordance with the present invention, the ratio of the formed image to the original copy image, namely, the magnification can be changed. Then, when the magnification is large, the returning speed of the scanning means is made high, and thereby the time can be shortened. Also, when the magnification is small, the returning speed is reduced and thereby the vibration of the machine can be minimized.

These objects, other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 5:
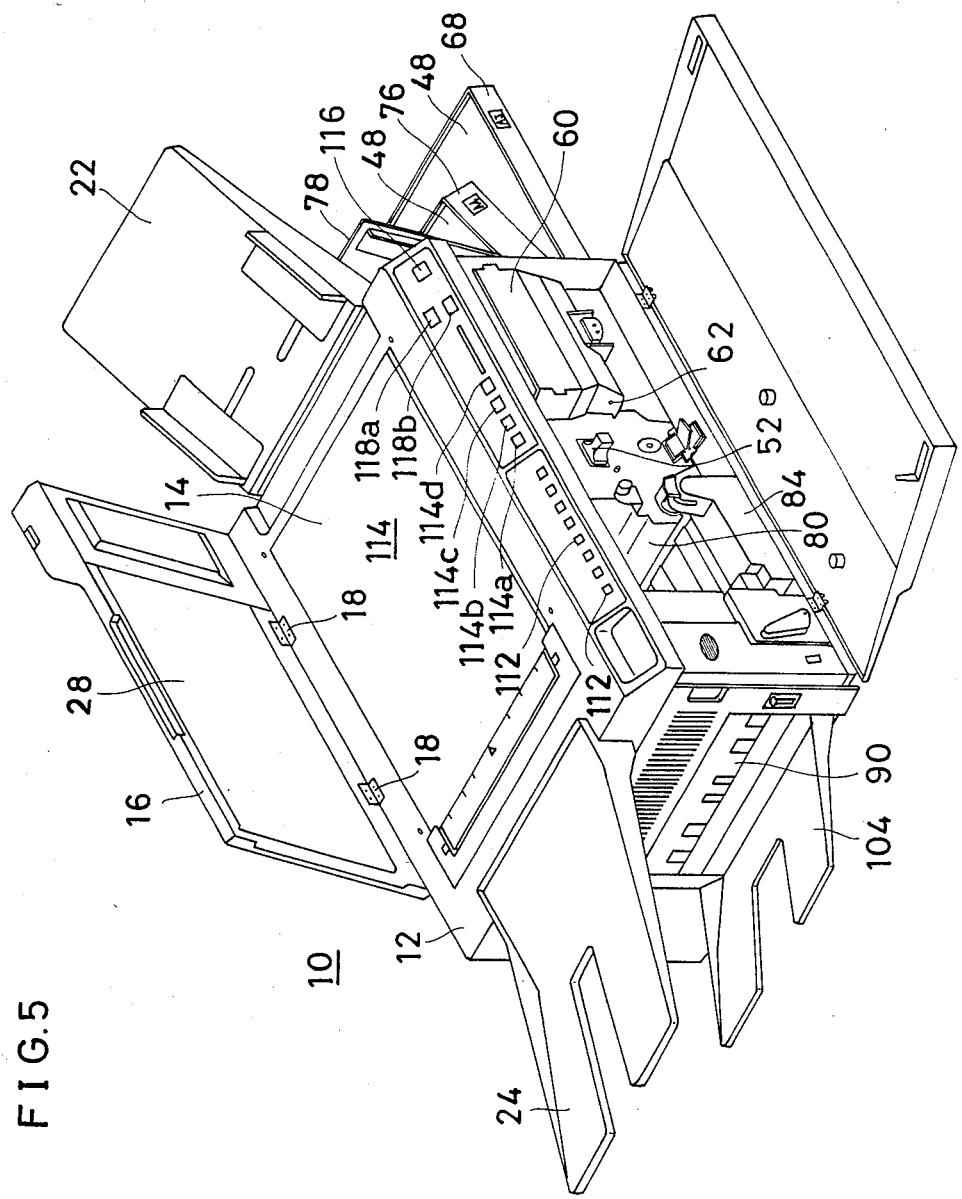
FIG. 5 is a perspective view showing an electrographic copying machine as one embodiment of the present invention.
Figure 6:
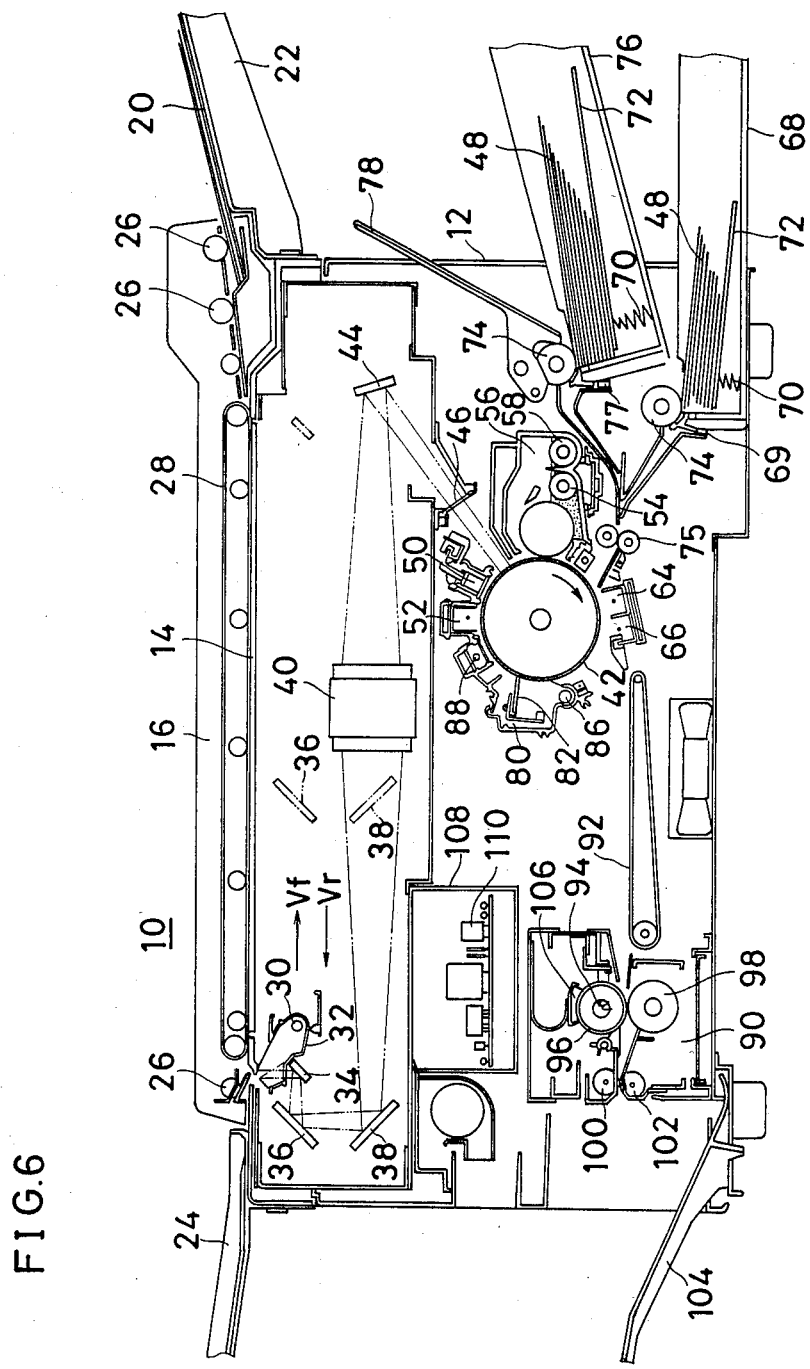
FIG. 6 is a cross-sectional illustrative view for explaining the inner structure of FIG. 5.

FIG. 5 is a perspective view showing an electrographic copying machine as one embodiment in accordance with the present invention, and FIG. 6 is a cross-sectional illustrative view for explaining the inner structure thereof.

Hereinafter, the present invention is described as an application to an electrographic copying machine, and it is pointed out in advance that the present invention can be applied also to image forming apparatuses other than such an electrographic copying machine, for example, the printer, facsimile and the like, and further can be applied to a type of apparatus forming a magnetic image besides the type of apparatus developing an electrostatic latent image with a toner.

In reference to FIG. 5 and FIG. 6, an electrographic copying machine 10 includes a copying machine main body 12, and on the top surface of this copying machine main body 12, an original copy table 14 composed of a transparent glass plate is installed in a fixed fashion. On the upper part of this original copy table 14, an automatic document feeder 16 is mounted by means of hinges 18 at the side end thereof. At the leading end side of this automatic document feeder 16, an original copy placing table 22 whereon original copies 20 before copying are stocked is installed, and at the trailing end side of the automatic document feeder 16, a tray 24 receiving original copies after copying is installed. The automatic document feeder 16 includes a plurality of rollers 26, 26 . . . and an endless belt 28 for picking up and carrying the original copies 20 placed on the original copies placing table 22.

Under the original copy table 14 in the copying machine main body 12, a light source 30 as a scanning means for exposing and scanning the original copy is installed, and this light source 30 is made movable from one end side to the other end side of the original copy table 14 and in the reverse direction thereto. Then, the movement in the right-left direction of this light source 30 is achieved by driving by means of a servo motor (not illustrated). Associated with the light source 30, a reflecting mirror 32 having elliptic cross-section is provided. A first movable mirror 34 is fixed to this reflecting mirror 32. When the light source 30 goes in the right direction in FIG. 6 by means of the servo motor, the original copy placed on the original copy table 14 is exposed through a slit, and such an exposure is not performed when the light source 30 returns in the left direction in FIG. 6. In FIG. 6, the moving speed of the light source 30 at forward going motion is represented as "Vf", and the moving speed at returning motion is represented as "Vr".

Associated with the first movable mirror 34, a second movable mirror is provided, and this second movable mirror comprises a pair of movable mirrors 36 and 38. This pair of movable mirrors 36 and 38 are for reflecting again the original copy image reflected by the first movable mirror 34 toward an image-forming lens 40. These second movable mirrors 36 and 38 can be moved in the same direction as that of this light source 30 at a speed of ½ of the moving speed of the light source 30, namely, Vf/2 or Vr/2. Furthermore, the image-forming lens 40 is constituted with a zoom lens, and accordingly, the electrographic copying machine of the present embodiment can change the copy magnification.

In front of the image-forming lens 40, a fixed reflecting mirror 44 for reflecting the original copy image transmitted through this lens 40 toward a photosensitive drum 42 is installed. Then, an infrared absorbing filter 46 is inserted between this fixed reflecting mirror 44 and the photosensitive drum 42.

A side erase lamp 50 is provided at an upstream side of the exposure position of the photosensitive drum 42, that is, the position where the original copy image is produced by the reflecting mirror 44, and this side erase lamp 50 is for removing charges on the portion corresponding to the side edge part of the copy paper on the photosensitive drum 42. At a further upstream side of this side erase lamp 50, a charging corotron 52 for uniformly accumulating charges of a specific polarity on the photosensitive drum 42 is installed.

A developing apparatus 56 is installed at a downstream side of the above-mentioned exposure position of the photoreceptor 42, and an electrostatic latent image formed on this photosensitive drum 42 by the charging corotron 52, the light source 30 and the image-forming lens 40 is developed by this developing apparatus 56. The developing apparatus 56 includes a toner container 60 (FIG. 5) for feeding a toner, and associated with this toner container 60, the developing apparatus 56 further includes screw conveyors 54 and 58. These screw conveyors 54 and 58 are for stirring a carrier and the toner. Furthermore, the toner container 60 is mounted in a manner that it can swing back and forth with a supporting axis 62 (FIG. 5) acting as a fulcrum.

At one side end of the copying machine main body 12 a paper feeding part is formed, and in this paper feeding part, in the present embodiment, two paper feeding cassettes 68 and 76 are loaded in a freely attachable/detachable fashion. In the paper feeding cassette 68, for example, papers 48 of A3 size are accommodated in a laminated fashion, and in the other paper feeding cassette 76, for example, papers 48 of A4 size are accommodated in a stacked fashion. A compression spring 70 and a supporting plate 72 for pushing the stacked papers 48 upward are provided in the inner bottom part of respective paper feeding cassettes 68 and 76. A paper at the top of papers accommodated in the paper feeding cassette 68 or 76 is pressed against a paper feeding roller 74 by this spring 70 and the supporting plate 72. The paper feeding roller 74 takes the paper 48 thus pressed one by one in sequence onto a register roller 75 from this paper feeding cassette 69 or 76 by means of rotation thereof. The rotation time of this paper feeding roller 74 is the above-mentioned time Tp, and this time Tp is set so as to agree with a predetermined time during which the tip of the paper 48 is brought in contact with the register roller 75 by the paper feeding roller 74. In the present embodiment, a manual paper feeding table 78 is further provided in the paper feeding part, and when this manual paper feeding table 78 is rotated clockwise from a state as shown in FIG. 6 to become a nearly horizontal state, a manual paper feeding can be performed.

Cassette sensors 69 and 77 which can detect the presence of the paper feeding cassettes 68 and 76 in a loaded state are provided, respectively. These cassette sensors 69 and 77 respectively include, for example, a limit switch whose actuator is actuated by the paper feeding cassette 68 or 76 in a state loaded in the main body 12.

At the downstream side of the developing apparatus 56, a transferring corotron 64 and a separating corotron 66 are installed in an one-body fashion.

When the paper 48 is fed from the paper feeding cassette 68 or 76, that is, the paper feeding part, a toner image formed on the photosensitive drum 42 is transferred onto the paper 48 by the transferring corotron 64. In transferring by this transferring corotron 64, the paper is attracted to the drum 42, being likely to move together with this drum 42, but it is separated by the separating corotron 66, being carried toward a vacuum conveyor 92 as described later.

A cleaning apparatus 80 is provided at the downstream side (top left in FIG. 6) of the separating corotron 66 along the photosensitive drum 42, and this cleaning apparatus 80 removes the toner which is not transferred completely and remains on the photosensitive drum 42. This cleaning apparatus includes a rubber blade 82 for scraping the toner remaining on the photosensitive drum 42, and the remaining toner scraped off by this blade 82 is sent out to a waste toner container 84 by a screw conveyor 86.

Furthermore, at the upstream side of the cleaning apparatus 80, a charge-removing lamp 88 for removing the charges remaining on the photosensitive drum 42 is provided, and the above-mentioned charging corotron 52 is disposed at a further downstream side of this charge-removing lamp 88.

The paper separated from the photosensitive drum 42 by the separating corotron 66 is sent to a fixing apparatus 90 by the vacuum conveyor 92. This fixing apparatus 90 includes a heating roller 96 incorporating a heater 94 and a pressure roller 98 for pressure-contacting the paper with this heating roller 96. Accordingly, the toner image transferred on the paper 48 is heated and pressed by the two rollers 96 and 98, being fixed on the paper 48. The paper completing fixation is discharged on a discharged paper tray 104 by means of a pair of paper discharging rollers 100 and 102. In addition, associated with the heating roller 96, and oil supplying part 106 is provided for supplying to the roller 96 with silicone oil.

A control box 108 is formed above the fixing apparatus 90 in the copying machine main body 12, and a component 110 for a control system as described later is provided in this control box 108.

As shown in FIG. 5, a ten-key 112 is provided on the key panel of the electrographic copying machine 10, and this ten-key 112 is used for setting the number of sheets to be copied. Magnification setting keys shown generally by a freference number 114 are provided on the key panel, and in the present embodiment, these magnification setting keys 114 include one magnification key 114a, two reduction keys 114b and 114c and a full-size key 114d. When the full-size key 114d is operated, "1.0" is set for the copy magnification (m). When the magnification key 114a is operated, m=1.2 is set. Then m=0.8 can be set by the reduction key 114b, and m=0.7 can be set by the reduction key 114c, respectively. A start key 116 provided on the key panel is used for instructing a copy start. Selection keys 118a and 118b for selecting the paper size, that is, the paper feeding cassette are further provided on the key panel. By depressing the cassette selection key 118a, for example, the upper paper feeding cassette 76 is selected, and by depressing the cassette selection key 118b, the lower paper feeding cassette 68 is selected. In other words, in the present embodiment, the paper of A4 size is selected by the cassette selection key 118a, and the paper of A3 size is selected by the cassette selection key 118b, respectively.

Figure 7:
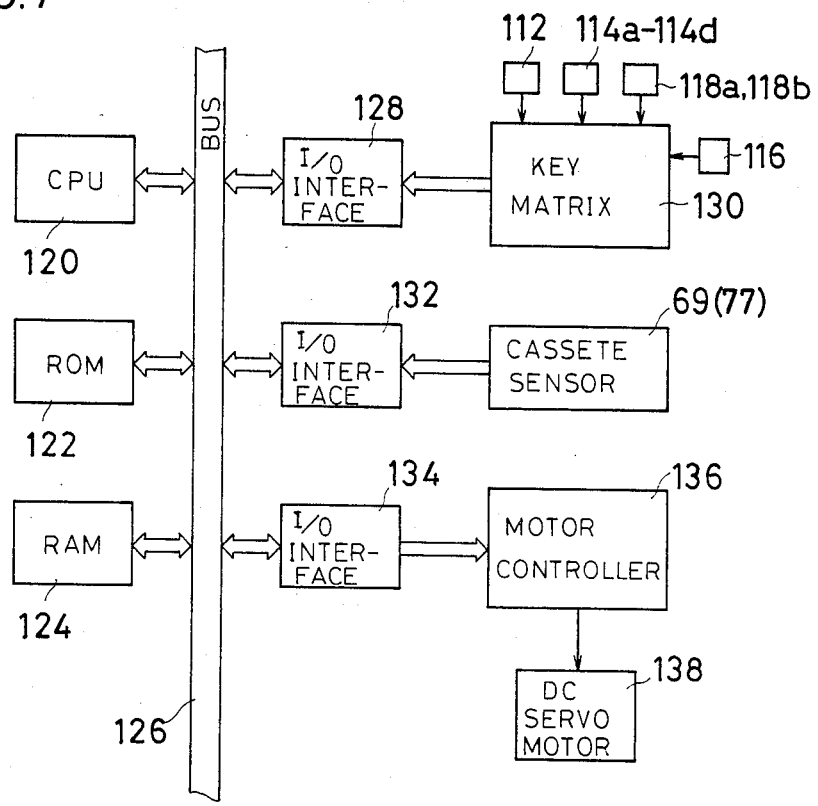
FIG. 7 is a block diagram showing a control system of an electrographic copying machine as shown in FIG. 5 and FIG. 6.

FIG. 7 is a block diagram showing an outline of the control system of the present embodiment. A CPU 120, a ROM 122 and a RAM 124 are connected through bus lines 12b and these bus lines 126 include an address bus, data bus and control bus. Then, a key matrix 130 is connected to these bus lines 126 through an I/O interface 128. The key matrix 130 is connected to respective keys 112, 114a through 114d, 116, 118a and 118b on the key panel as shown in FIG. 5, and in response to an operation signal from each key, it outputs a specific key code responding to the key. The cassette sensors 69 and 77 are provided in the paper feeding part as described above, detecting the size of the cassette loaded therein, that is, the paper size. For example, when the cassette selection key 118 is selected, the cassette sensor 77 is enabled, and a signal indicating that the paper of A4 size has been selected is inputted from the I/O interface 132. When the cassette selection key 118b is depressed, a signal indicating that the paper of A3 size has been selected is obtained likewise from the cassette sensor 69. A motor controller 136 is further connected to the bus lines 126 through an I/O interface 134. For example, the integrated circuit "HL-101C" made by Sanyo Electric Co., Ltd. is utilized for this motor controller 136, and a DC servo motor 138 is connected to this motor controller 136. This DC servo motor 138 is a motor for reciprocatively moving the light source 30 as an exposure-scanning means and related components. The motor controller 136 includes, for example, a gate array and controls the magnitude and the application time of the voltage applied to the DC servo motor 138 in response to the speed data and the moving distance data read from the ROM.

Data of the above-mentioned speeds, that is, the forward going speed Vf and the returning speed Vr and the moving distance to be given to this motor controller 136 are stored in advance in the ROM 122. Basically, such speed data are changed corresponding to the paper size to be used, and further in the case of the copying machine with variable magnification as in the present embodiment, the data are changed responding to the copy magnification (m) thereof.

Figure 8:
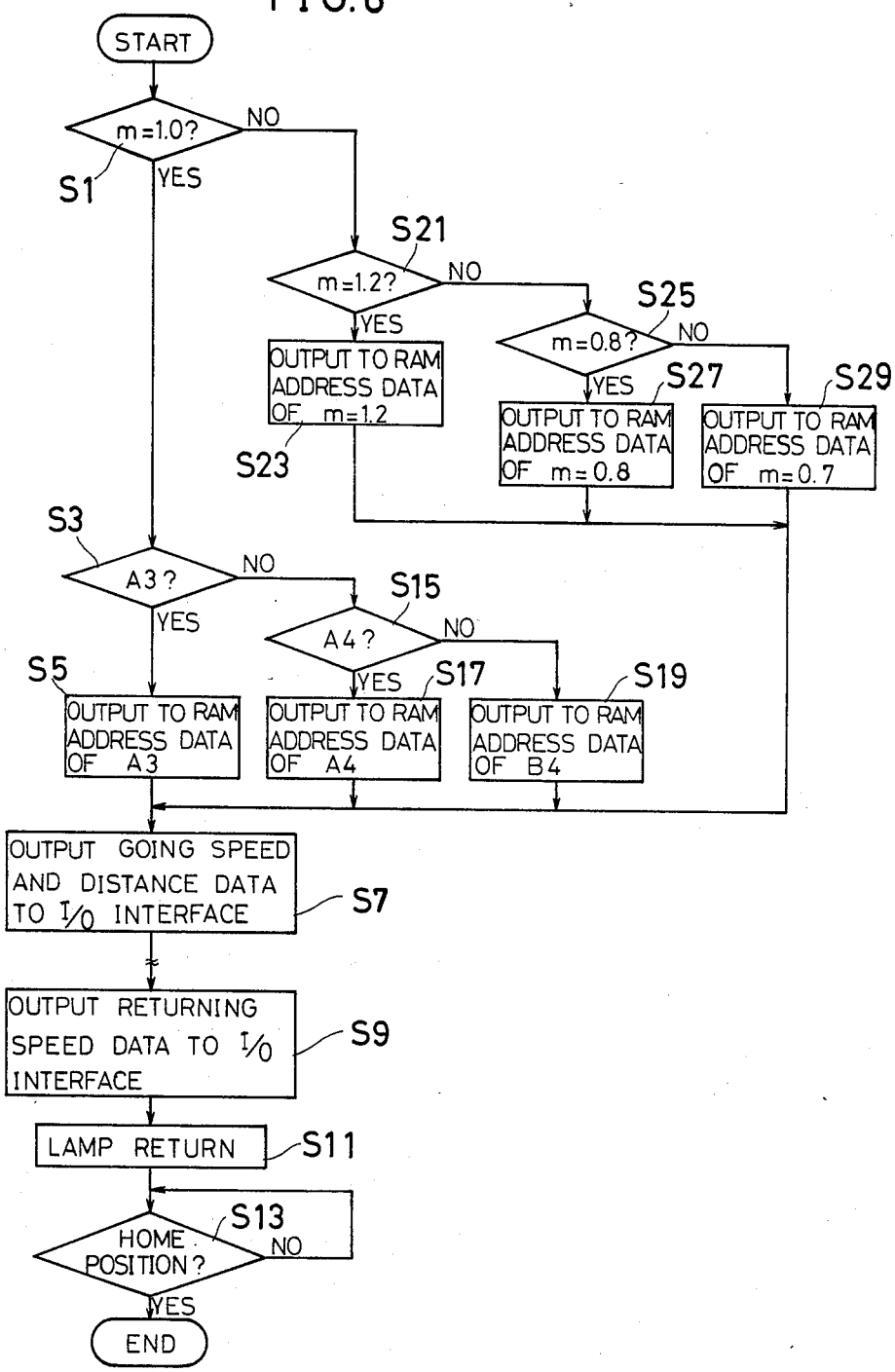
FIG. 8 is a flow chart for explaining the operation of an electrographic copying machine as an embodiment.

FIG. 8 is a flow chart for explaining the operation of the present embodiment. This flow chart as shown in FIG. 8 is started in response to depressing the copy start key 116 (FIG. 5), and normally the operator has to perform other key operations before depressing the start key 116. First, the operator places the original copy to be copied on the original copy placing table 22. Then the operator operates the cassette selection key 118a or 118b to select the paper size responding to the original copy and also operates the ten-key 112 to set a required number of sheets to be copied. Any one of the magnification setting keys 114a through 114d is cooperated to select a required copy size. After completing such a group of preparatory works, the operator depresses the start key 116.

When the start key 116 (FIG. 5) is depressed, the CPU 120 first reads the data of copy magnification (m) based on a signal from the key matrix 30. Then, in the first step S1, decision is made whether or not the copy is of full size, namely, the copy magnification (m) is 1.0. If m=1.0, the CPU 120 decides whether or not the cassette selection key 118b has been operated, that is, the size of paper to be used is A3 based on the data from the I/O interface 132 in the following step S3. If the cassette 68 is loaded and the size selection key 118b is operated, the paper of A3 size is selected and the process proceeds to the following step S5. In the step S5, data of the address of the ROM where the data on the movement of the light source 30 in the case of m=1.0 and A3 size is stored is read.

Figure 9:
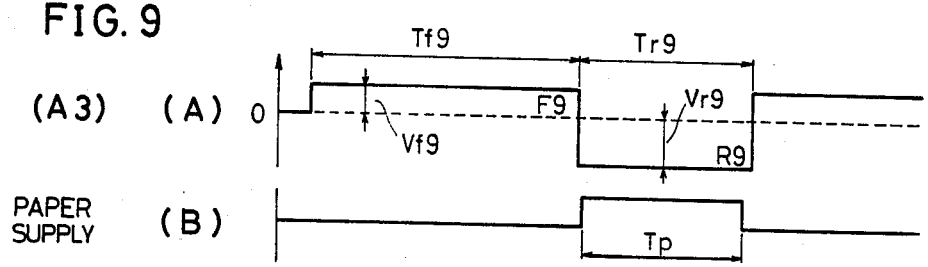
FIG. 9 through FIG. 13 are graphs respectively different examples of the relationship between the moving speed and time of the light source in accordance with the present embodiment.

FIG. 9 is a graph showing a relationship between the moving speed and time of the light source in the case of m=1.0 and A3 size, and in the above-mentioned step S5, more specifically, the addresses for respective data as shown in this FIG. 9 are outputted, and the ROM 122 (FIG. 7) is addressed. In the case as shown in FIG. 9, the distance scanned by the light source 30 (this is equivalent to an area F9 (=R9)) is set to "466 mm" including the paper length of 436 mm and a required preliminary distance of 30 mm because of the paper of A3 size. In addition, although the length of the paper of A3 size is 420 mm, in the present embodiment, the scanning distance is set to 436 mm with a margin of 4 mm added so as to be applicable also to the regal size whose length is 432 mm. The forward going speed Vf9 of the light source 30 (FIG. 6) is set as "190 mm/sec", and the returning speed Vr9 is set as "580 mm/sec". Accordingly, the scanning times Tf9 and Tr9 are 2.5 sec and 0.8 sec, respectively. Therefore, an overall scanning time is Tf9+Tr9=3.3 sec. In addition, the time Tp required for feeding the paper as shown in FIG. 9(B) is 0.7 sec. In the case as shown in FIG. 9, in the step S5, specific data as described above of such scanning distance F9 (=R9), forward going speed Vf9 and the returning speed Vr9 are read from the ROM 122 and stored once in the RAM 124. Thereafter in the step S7, first, F9 (=R9)=466 mm and Vr9=190 mm/sec are outputted to the I/O interface 134. Accordingly, the motor controller 136 controls the DC servo motor 138 so that the light source 30 is moved at the forward going speed Vf9 during the scanning time Tf9 (F9/Vf9) responding to the data.

Thereafter, in the step S9, data on the returning speed Vr9 of the light source 30 are given to the I/O interface 134, that is, the motor controller 136. Accordingly, in the step S11, the light source 30 is driven to return responding to the returning speed Vr9. In the case as shown in FIG. 9, the paper feeding time Tp is 0.7 sec, and the returning time Tr9 (=0.8 sec) agrees nearly with the paper feeding time Tp.

Then, decision is made on whether or not the light source 30 has returned to the home position by means of a home position sensor (not illustrated) (in the step S13). Then, when the light source 30 returns to the home position, the servo motor 138 is controlled to stop the light source 30, and thereby this routine is completed.

In the previous step S3, when the paper size is decided not to be A3, the process proceeds to the other step S15, and in this step S15, the CPU 120 decides whether or not the paper is of A4 size based on a signal from the I/O interface 132. Decision of "YES" in this step S15 means the full-sized copy (m=1.0) and A4 size paper. Accordingly, in the next step S17, likewise the previous step S5, the CPU 120 outputs the address data for the data on the movement of the light source 30 in the case of m=1.0 and the paper size of A4 stored in the ROM 122 in advance. Then, steps S7 and S9 are executed again, and a control as shown in FIG. 10 is performed.

Figure 10:
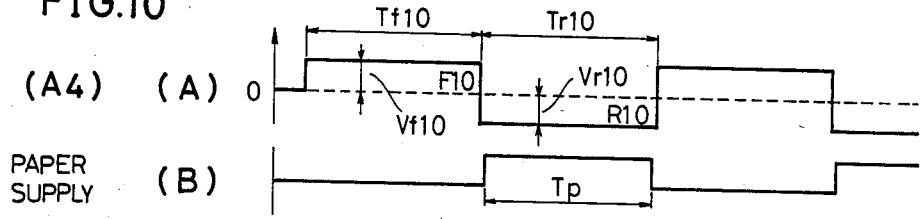
Figure 12:
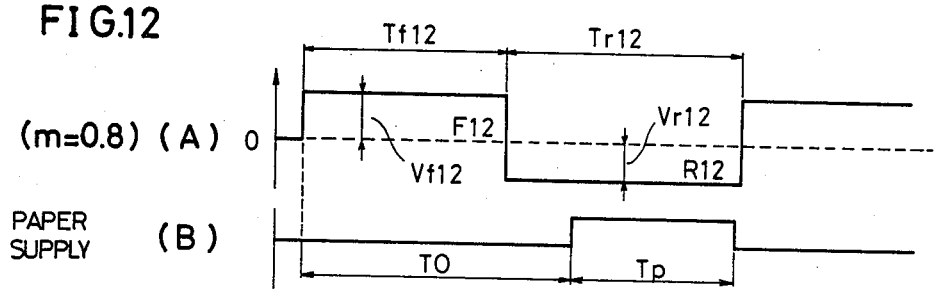

FIG. 10 is a graph showing a relationship between the moving speed and time of the light source in the case where m is 1.0 and the size is A4, and in the above-mentioned step S17, more specifically, addresses for respective data as shown in FIG. 12 are outputted, and the ROM 122 (FIG. 7) is addressed. In the case as shown in FIG. 10, the distance scanned by the light source 30 (this is equivalent to an area F10 (=R10)) is shorter than that in the case of FIG. 9 because of the paper of A4 size, and the distance is set as "330 mm", including the paper length of 300 mm (length of A4 size of 297 mm plus a margin of 3 mm) and a required preliminary distance of 30 mm. The forward going speed Vf10 of the light source 30 (FIG. 6) is set as "190 mm/sec" being the same as that in the case of FIG. 9, and the returning speed Vr12 is set as "410 mm/sec" being lower than that in the case of FIG. 9. Accordingly, the scanning times Tf10 and Tr10 are 1.7 sec and 0.8 sec, respectively. Therefore, an overall scanning time is Tf10+Tr10=2.5 sec. In addition, the time required for feeding the paper Tp as shown in FIG. 10(B) is 0.7 sec, being the same as that in the case of A3 size. In the case as shown in FIG. 10, in the step S17, specific data of such scanning distance F10 (=R10), forward going speed Vf10 and returning speed Vr10 are read from the ROM 122, being stored once in the RAM 124. Thereafter, in the step S7, first, F10 (=R10)×330 mm and Vr10=190 mm/sec are outputted to the I/O interface 134. Accordingly, the motor controller 136 controls the DC servo motor 138 so that the light source 30 is moved at the forward going speed Vf10 during the scanning time Tf10 (F10/Vf10) responding to the data.

Figure 1:
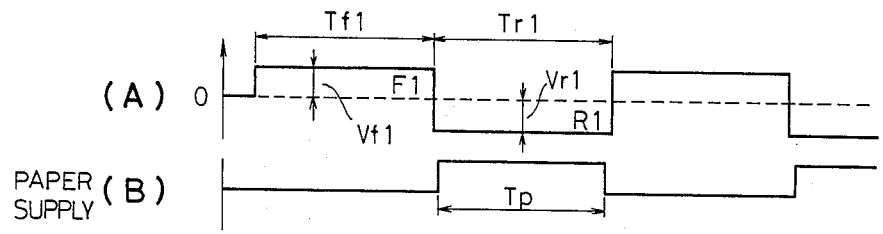
FIG. 1 and FIG. 2 are graphs showing one conventional example of the relationship between the moving speed and time of a light source.
Figure 2:
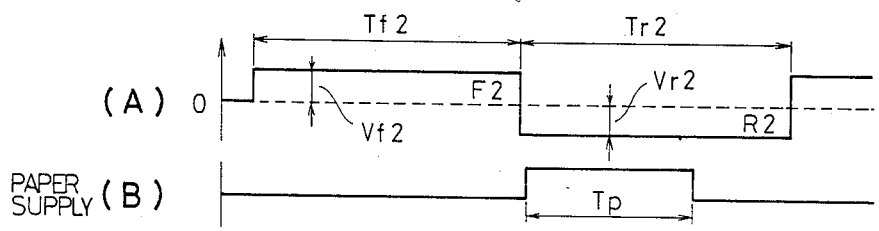
Figure 3:
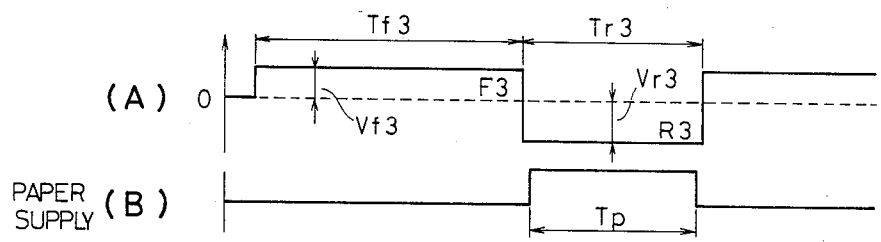
FIG. 3 and FIG. 4 are graphs showing other examples of the relationship between the moving speed and time of a light source.
Figure 4:
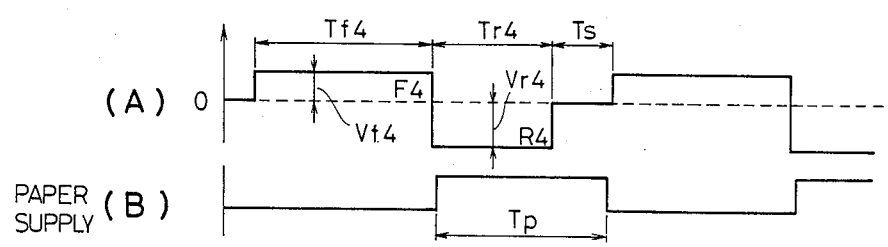

Thereafter, in the step S9, the data on the forward going speed Vr10 of the light source 30 are given to the I/O interface 134, that is, the motor controller 136. Accordingly, in the step S11, the light source 30 is driven to return responding to the returning speed Vr10. In the case as shown in FIG. 10, the paper feeding time Tp is 0.7 sec, while the returning speed of the light source 30 is made lower, and the returning time Tr10 (=0.8 sec) agrees nearly with the paper feeding time Tp. If the light source 30 returns at a speed as high as that in FIG. 9 in the case of A4 size, a waiting time is produced like the conventional example in FIG. 4. However, by lowering the returning speed of the light source 30 as shown in the embodiment, no waiting time is produced, and also the mechanical shock can be weakened.

In addition, description on the case as shown in the step S19, that is, on the case of m=1.0 and B4 size will be omitted here.

Figure 11:
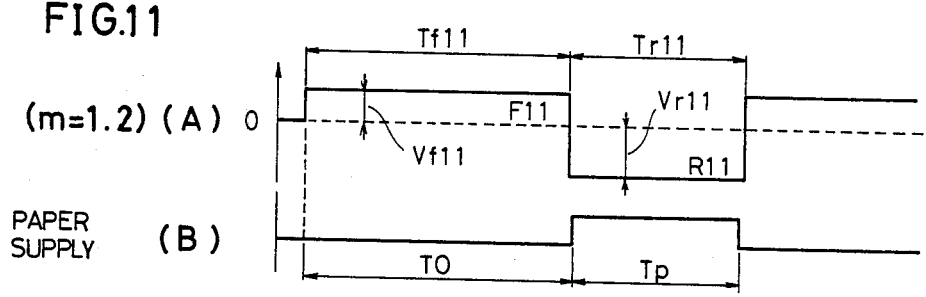

Furthermore, if the CPU 120 decides that m is not 1.0 in the previous step S1, the process proceeds to the outer step S21, and in this step 521, the CPU 12 decides whether or not m is 1.2 based on a signal from the I/O interface 128. Then, if decision is made to be m=1.2, in the next step S23, the address of the ROM 122 where the data on the movement of the light source 30 in the case of m=1.2, that is, in the case a shown in FIG. 11 is stored in advance is specified. Then, data is read from this address, and is instructed to the motor controller 136 from the CPU 120 through the I/O interface 134 in the steps S7 and S9.

FIG. 11 is a graph showing a relationship between the moving speed and time of the light source in the case of m=1.2, and in the above-mentioned step S23, more specifically, addresses for respective data as shown in this FIG. 11 are outputted, and the ROM 122 (FIG. 7) is addressed. In the case as shown in FIG. 11, the distance scanned by the light source 30 (this is equivalent to an area F11 (=R11) is not required to be 436/1.2=363 mm or more, and therefore in view of a preliminary distance of 30 mm, setting is made as "393 mm". The forward going speed Vf11 of the light source 30 (FIG. 6) is set as "158 mm/sec" which is lower than the examples in FIG. 9 and FIG. 10, and the returning speed Vr11 is set as "500 mm/sec" which is lower than in the case of FIG. 9. Accordingly, the scanning time Tr11 and Tr11 are 2.5 sec and 0.8 sec, respectively. Therefore, an overall scanning time is Tf11+Tr11=3.3 sec. In addition, the time required for feeding the paper as shown in FIG. 11(B) is 0.7 sec, being the same as described above. In the case as shown in FIG. 11, in the step S23, more specific data of the forward going speed Vf11 and the returning speed Vr11 are read from the ROM 122, being stored once in the RAM 124. Thereafter, in the step S7, first, F11 (=R11)=393 mm and Vf11=158 mm/sec are outputted to the I/O interface 134. Accordingly, the motor controller 136 controls the DC servo motor 138 so that the light source 30 is moved at the forward going speed Vf11 during the scanning time Tf11 (F11/Vf1) responding to the data.

Thereafter, in the step S9, data on the returning speed Vr1 of the light source 30 is given to the I/O interface 134, that is, the motor controller 136. Accordingly, in the step 11, the light source 30 is driven to return responding to the returning speed Vr11. In the case as shown in FIG. 11, the paper feeding time Tp is 0.7 sec, while the returning time Tr11 (=0.8 sec) of the light source 30 agree nearly with the paper feeding time Tp, because the returning distance R11 is short although the returning speed is lower than that in the case of FIG. 9.

When decision is made to be "NO" in the previous step S21, the process proceeds to the other step S25. In the step S25, the CPU 120 decides whether or not m is 0.8 based on a signal from the I/O interface 128. Decision of "YES" in this step S25 means that the magnification setting key 114b (FIG. 5) has been operated and m=0.8 has been specified. Decision of "NO" in this step S25 means that the magnification setting key 114c has been operated and m=0.7 has been specified. Thus, in the case where the copy magnification (m) is 1.0 or less, that is, in the case of reduction copying, a maximum size of the original copy which can be copied (A3 in the present embodiment) is used as a standard for the distance scanned by the light source 30, and the same numeric value or data as that in the previous case of FIG. 9 is set.

Then, in the case of m=0.8, the process proceeds to the step S27 to perform a control as shown in FIG. 12.

FIG. 12 is a graph showing a relationship between the moving speed and time of the light source in the case of m=0.8, and in the above-mentioned step S27, more specifically, address data for respective data as shown in this FIG. 12 are outputted, and the ROM 122 (FIG. 7) is addressed. The forward going speed Vf12 of the light source 30 (FIG. 6) is set as "238 mm/sec" which is higher than that in the case of FIG. 9, and the returning speed Vr12 is set as "360 mm/sec" which is considerably lower than that in the case of FIG. 9. Accordingly, the scanning times Tf12 and Tr12 are 2.0 sec and 1.3 sec. respectively. Therefore, an overall scanning time is Tf12+Tr12=3.3 sec, being the same as that in the case of FIG. 9. In addition, the time required for feeding the paper as shown in FIG. 12(B) Tp is 0.7 sec. In the case as shown in FIG. 12, in the step S27, specific data of such scanning distance F12 (=R12), forward going speed Vf12 and returning speed Vr12 are read from the ROM 122, being stored once in the RAM 124. Thereafter, in the step S7, first, F12 (=R12)=466 mm and Vf12=238 mm/sec are outputted to the I/O interface 134. Accordingly, the motor controller 136 controls the DC servo motor 138 so that the light source 30 is moved at the forward going speed Vf12 during the scanning time Tf12 (F12/Vf12) responding to the data.

Thereafter, in the step S9, data on the returning speed Vr12 of the light source 30 is given to the I/O interface 134, that is, the motor controller 136. Accordingly, in the step 11, the light source 30 is driven to return responding to the returning speed Vr12. In the case as shown in FIG. 12, the timing of end of returning motion of the light source 30 agrees nearly with the timing of end of paper feeding.

Figure 13:
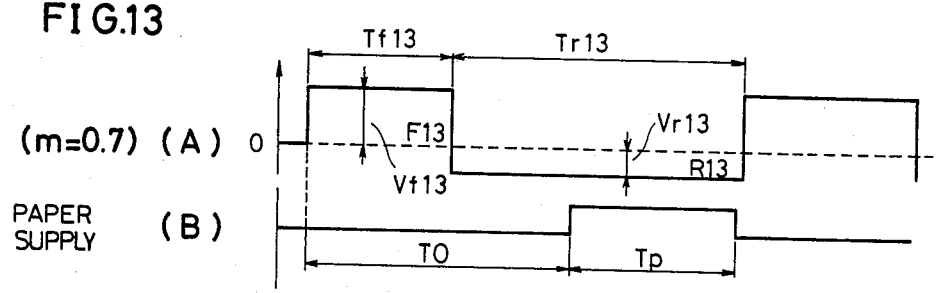

Then, in the case of m=0.7, the process proceeds to the step S29 to perform a control as shown in FIG. 13.

FIG. 13 is a graph showing a relationship between the moving speed and time of the light source in the case of m=0.7, and in the above-mentioned step S27, more specifically, address data for respective data as shown in FIG. 13 are outputted, and the ROM 122 (FIG. 7) is addressed. The forward going speed Vf13 of the light source 30 (FIG. 6) is set as "217 mm/sec" being still higher than that in the case of FIG. 12, and the returning speed Vr13 is set as "300 mm/sec", being still lower than that in the case of FIG. 12. Accordingly, the scanning times Tf13 and Tr13 are 1.7 sec and 1.6 sec, respectively. Therefore, an overall scanning time is Tf13+Tr13=3.3 sec, being the same as those in the cases of FIG. 9 through FIG. 12. In addition, the time Tp required for feeding the paper as shown in FIG. 13(B) is 0.7 sec. in the case as shown in FIG. 13, in the step S29, specific data of such scanning distance F13 (=R13), forward going speed Vf13 and returning speed Vr13 are read from the ROM 122, being stored once in the RAM 124. Thereafter, in the step S7, first, F13 (=R13)=466 mm and Vf13=271 mm/sec are outputted to the I/O interface 134. Accordingly, the motor controller 136 controls the DC servo motor 138 so that the light source 30 is moved at the forward going speed Vf13 during the scanning time Tf13 (F13/Vf13) responding to the data.

Thereafter, in the step S9, data on the returning speed Vr13 of the light source 30 is given to the I/O interface 134, that is, to the motor controller 136. Accordingly, in the step S11, the light source 30 is driven to return responding to the returning speed Vr13. In the case as shown in FIG. 13, the paper feeding time Tp is 0.7 sec, and the timing of end of returning motion of the light source 30 agrees nearly with the time of end of paper feeding.

Furthermore, in the above-mentioned embodiment, description is made on the electrographic copying machine wherein the copy magnification can be changed stepwise. However, it is needless to say that the present invention can be utilized also for the coping machine wherein the copy magnification can be changed continuously. In this case, for example, data of the forward going speed Vf and the returning speed Vr and the like have only to be stored in the ROM in advance corresponding to every change of 1% in the copy magnification.

Furthermore, in the above-mentioned embodiment, description is made on the electrographic copying machine wherein the light source can move to perform exposure-scanning of the original copy. However, the present invention is applicable likewise to the copying machine wherein the original copy, that is, the original copy table is made movable and the light source is installed in a fixed manner. In this case, the original copy table acts as a scanning means, and the DC servo motor 138 (FIG. 7) can be used to move such an original copy table.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrostatic recording apparatus comprising
    a scanning means being moved reciprocatively for scanning an original copy,
    a paper feeding means for feeding papers,
    a visible image forming means for forming an image responding to an original copy scanned by said scanning means as a visible image on a paper fed by said paper feeding means, and
    a moving speed changing means for changing the moving speed at returning motion of said scanning means associated with the time of paper feeding means.

2. An electrostatic recording apparatus in accordance with claim 1, wherein said moving speed changing means changes the moving speed at returning motion of said scanning means responding to the forward going distance of said scanning means.

3. An electrostatic recording apparatus in accordance with claim 2, wherein said moving speed changing means makes said moving speed at returning motion higher when said forward going distance is longer.

4. An electrostatic recording apparatus in accordance with claim 2 further comprising
    a size recognizing means being provided associated with said paper feeding means for recognizing the size of said fed paper, wherein
    said moving speed changing means changes said moving speed responding to the said size of paper recognized by said size recognizing means.

5. An electrostatic recording apparatus in accordance with claim 4, wherein said moving speed changing means makes said moving speed high when said size of paper is large.

6. An electrostatic recording apparatus in accordance with claim 1 further comprising
    a magnification setting means for setting the magnification of said visible image to the original copy, wherein
    said moving speed changing means changes the moving speed at returning motion of said scanning means responding to the magnification set by said magnification setting means.

7. An electrostatic recording apparatus in accordance with claim 6, wherein said moving speed changing means makes said moving speed higher when a larger magnification is set by said magnification setting means.

8. An electrostatic recording apparatus in accordance with any one of claim 1 through claim 7 further comprising
    an original copy table which places said original copy and is installed in a fixed manner, wherein
    said scanning means comprises a light source which exposes the original copy placed on said original copy table and is installed movably itself.

* * * * *